(12) United States Patent
Nakano et al.

(10) Patent No.: US 9,932,919 B2
(45) Date of Patent: Apr. 3, 2018

(54) ENGINE

(71) Applicant: Yanmar Co., Ltd., Osaka-shi, Osaka (JP)

(72) Inventors: Satoshi Nakano, Osaka (JP); Ryou Yuuki, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 214 days.

(21) Appl. No.: 14/780,305

(22) PCT Filed: Feb. 25, 2014

(86) PCT No.: PCT/JP2014/054464
§ 371 (c)(1),
(2) Date: Sep. 25, 2015

(87) PCT Pub. No.: WO2014/156427
PCT Pub. Date: Oct. 2, 2014

(65) Prior Publication Data
US 2016/0040613 A1 Feb. 11, 2016

(30) Foreign Application Priority Data
Mar. 28, 2013 (JP) ................................. 2013-069485

(51) Int. Cl.
*F02D 41/00* (2006.01)
*F02M 25/07* (2006.01)
(Continued)

(52) U.S. Cl.
CPC ....... *F02D 41/0052* (2013.01); *F02D 41/005* (2013.01); *F02M 25/0726* (2013.01);
(Continued)

(58) Field of Classification Search
CPC ... F02D 41/005–41/0052; F02M 26/22–26/28; F02M 26/33; F02M 26/50
(Continued)

(56) References Cited

U.S. PATENT DOCUMENTS 4,489,242 A * 12/1984 Worst ......................... B60L 1/00
123/142.5 E
5,617,726 A * 4/1997 Sheridan ............... F02B 37/007
123/568.12

(Continued)

FOREIGN PATENT DOCUMENTS

JP 2003-138990 A 5/2003
JP 2003-148189 A 5/2003
(Continued)

OTHER PUBLICATIONS

International Preliminary Report on Patentability (PCT/IB/326, PCT/IB/338 & PCT/IB/373) including Written Opinion (PCT/ISA/237) issued in PCT Application No. PCT/JP2014/054464 dated Oct. 8, 2015 with English translation (10 pages).
(Continued)

*Primary Examiner* — Mahmoud Gimie
*Assistant Examiner* — John Zaleskas
(74) *Attorney, Agent, or Firm* — Crowell & Moring LLP

(57) ABSTRACT

In an engine, a controller is configured to fully close the opening of EGR valve when a cut condition is satisfied and variably control the opening when a cut release condition is satisfied. An operating zone is defined as a zone surrounded by a characteristic curve indicating a relationship between rotation speed and torque. The operating zone comprises a high operating zone containing an NTE zone, and a low operating zone that is set at a lower torque side and at a lower rotation speed side with respect to the high operating zone. The cut condition is that an operating condition specified by the rotation speed and the torque is kept within the low operating zone during a predetermined time or more. The cut release condition is that the operating condition falls within the high operating zone.

4 Claims, 3 Drawing Sheets

(51) Int. Cl.
*F02M 26/50* (2016.01)
*F02M 26/28* (2016.01)
*F02M 26/33* (2016.01)
*F02M 26/47* (2016.01)

(52) U.S. Cl.
CPC .... *F02M 25/0739* (2013.01); *F02M 25/0753* (2013.01); *F02M 25/0772* (2013.01); *F02M 25/0798* (2013.01); *F02M 26/28* (2016.02); *F02M 26/33* (2016.02); *F02M 26/47* (2016.02); *F02M 26/50* (2016.02); *Y02T 10/47* (2013.01)

(58) Field of Classification Search
USPC ............ 123/568.11, 568.12, 568.21, 568.22
See application file for complete search history.

(56) References Cited

U.S. PATENT DOCUMENTS

| | | | | |
|---|---|---|---|---|
| 6,196,009 | B1* | 3/2001 | Nishi | B60H 1/3232 123/339.17 |
| 6,279,532 | B1* | 8/2001 | Takano | F02D 41/061 123/357 |
| 6,435,166 | B1* | 8/2002 | Sato | F02D 21/08 123/568.12 |
| 6,681,171 | B2* | 1/2004 | Rimnac | F02B 29/0418 123/568.22 |
| 6,725,847 | B2* | 4/2004 | Brunemann | F02D 41/005 123/568.12 |
| 6,904,898 | B1* | 6/2005 | Sahlen | F02M 26/50 123/568.12 |
| 7,168,250 | B2* | 1/2007 | Wei | F02B 37/013 123/568.12 |
| 7,707,998 | B2* | 5/2010 | Reuss | F02B 29/0412 123/568.12 |
| 7,971,576 | B2* | 7/2011 | Reuss | F02B 29/0412 123/563 |
| 2004/0098190 | A1* | 5/2004 | Nakayama | F02D 41/1403 701/104 |
| 2005/0145218 | A1* | 7/2005 | Radovanovic | B60K 6/24 123/352 |
| 2007/0131207 | A1* | 6/2007 | Nakamura | F02M 26/33 123/568.12 |
| 2008/0314036 | A1 | 12/2008 | Yokoyama et al. | |
| 2010/0031939 | A1* | 2/2010 | Ono | F02D 41/08 123/568.22 |
| 2010/0235074 | A1* | 9/2010 | Shinagawa | F02D 41/126 701/108 |
| 2011/0023839 | A1* | 2/2011 | Styles | F02M 26/25 123/568.12 |
| 2011/0048389 | A1* | 3/2011 | Hsia | F02D 41/005 123/568.12 |
| 2011/0108013 | A1* | 5/2011 | Melhem | F02B 47/08 123/568.12 |
| 2011/0239997 | A1* | 10/2011 | Surnilla | F01N 3/2066 123/568.21 |
| 2012/0226430 | A1* | 9/2012 | Shinagawa | F02D 41/0065 701/104 |
| 2014/0053553 | A1* | 2/2014 | Wolk | F02B 37/127 60/605.2 |
| 2014/0372011 | A1* | 12/2014 | Kim | F02D 41/0072 701/108 |

FOREIGN PATENT DOCUMENTS

| | | | |
|---|---|---|---|
| JP | 2003278582 A | * | 10/2003 |
| JP | 2005-16390 A | | 1/2005 |
| JP | 2008-180167 A | | 8/2008 |
| JP | 2009-2190 A | | 1/2009 |
| JP | 2010-190127 A | | 9/2010 |

OTHER PUBLICATIONS

International Search Report (PCT/ISA/210) issued in PCT Application No. PCT/JP2014/054464 dated Apr. 1, 2014 with English translation (five pages).

* cited by examiner

ENGINE

TECHNICAL FIELD

The present invention relates to an engine having an EGR cooler, an EGR valve, and a controller controlling the opening of the EGR valve.

BACKGROUND ART

In an engine having the EGR cooler, the opening of the EGR valve has hitherto been controlled on the basis of correction control based on exhaust gas temperature, etc. Document 1 discloses one example of such an engine.

PATENT DOCUMENT

Document 1: JP 2010-190127 A

SUMMARY OF THE INVENTION

Problem to be Solved by the Invention

In the conventional engine, the opening of the EGR valve is variably controlled irrespective of rotation speed and load. For this reason, even if operation continues at a low speed and at a low load, exhaust gas flows along an EGR path because the opening of the EGR valve is not fully closed. For example, in cases where the engine is applied as a drive source for a freezer and the temperature within the freezer can be kept at a target temperature regardless of a low engine load factor as in winter, operation continues at a low speed and at a low load. When low-speed and low-load operation continues, the temperature of the exhaust gas is relatively low. In such a case, if the opening of the EGR valve is continuously open, exhaust gas is cooled by the EGR cooler, with result that unburned components contained in exhaust gas are liquefied. The liquefied unburned components cohere with carbon contained in exhaust gas and deposit within the EGR cooler. The deposition of carbon lowers the flow rate of exhaust gas flowing through the EGR path. As a result, the discharge amount of nitrogen oxide may increase.

The low-speed and low-load operation may be interrupted by optionally altering the rotation speed or the load. In the case of the above freezing machine, however, the controller provides automatic control such that the temperature within the freezer is kept at a target temperature, and therefore the rotation speed or the load cannot be optionally altered as in manual control. It is undesirable in itself to alter the temperature within the freezer.

An object of the present invention is to provide an engine capable of preventing carbon from depositing within an EGR cooler even though operation continues at a low speed and at a low load.

Means for Solving Problem

An engine embodying the present invention comprising an EGR cooler, an EGR valve, and a controller controlling an opening of the EGR valve, the controller being configured to fully close the opening when a cut condition is satisfied and variably control the opening when a cut release condition is satisfied, wherein an operating zone is defined as a zone surrounded by a characteristic curve indicating a relationship between rotation speed and torque, the operating zone comprises a high operating zone containing an NTE zone, and a low operating zone that is set at a lower torque side and at a lower rotation speed side with respect to the high operating zone, the cut condition is that an operating condition specified by the rotation speed and the torque is kept within the low operating zone during a predetermined time or more, and the cut release condition is that the operating condition falls within the high operating zone.

The engine further comprises a common rail type fuel injector, wherein the controller is configured to specify three estimated torques, based on a load factor, an injection amount, and a rail pressure, and the cut condition and the cut release condition employ the maximum estimated torque among the three estimated torques as the torque for specifying the operating condition.

In the engine, the cut release condition includes: that the operating condition falls within the high operating zone; that an upstream temperature exceeds a predetermined upstream temperature; or that a downstream temperature exceeds a predetermined downstream temperature, and the upstream temperature and the downstream temperature is temperatures of exhaust gas at upstream side and at downstream side, respectively, with respect to the EGR cooler.

In the engine, the controller is configured to set a target value of the rotation speed to a low speed or a high speed, the low speed is the rotation speed at which the torque takes its peak value in the characteristic curve, and the high speed is the rotation speed higher than the low speed, the entirety of the torque at the high speed being contained in the high operating zone.

A freezing machine embodying the present invention comprises the engine; and a compressor driven by the engine.

Effect of the Invention

The engine according to the present invention is capable of preventing carbon from depositing within the EGR cooler even though operation continues at a low speed and at a low load.

EMBODIMENTS FOR CARRYING OUT THE INVENTION

Figure 1:
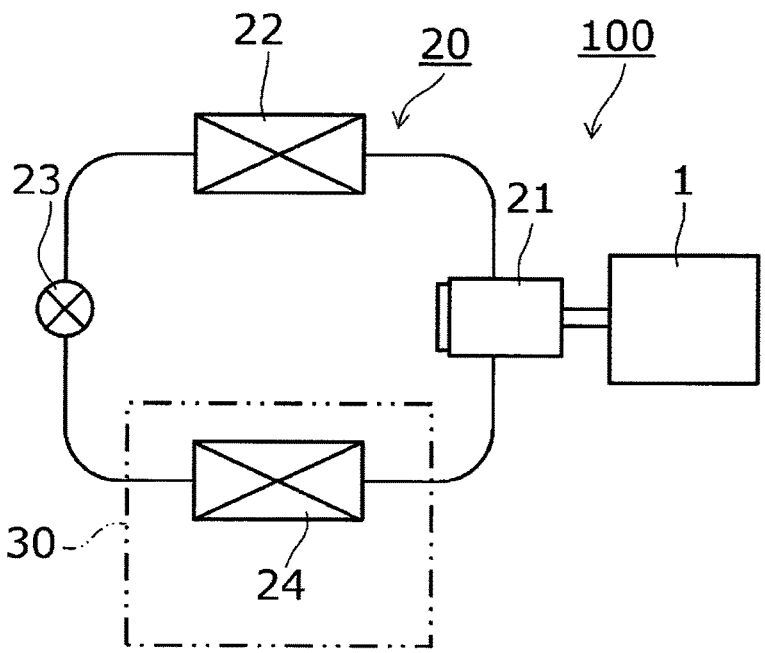
FIG. 1 is a block diagram of a freezing machine according to a first embodiment.
Figure 2:
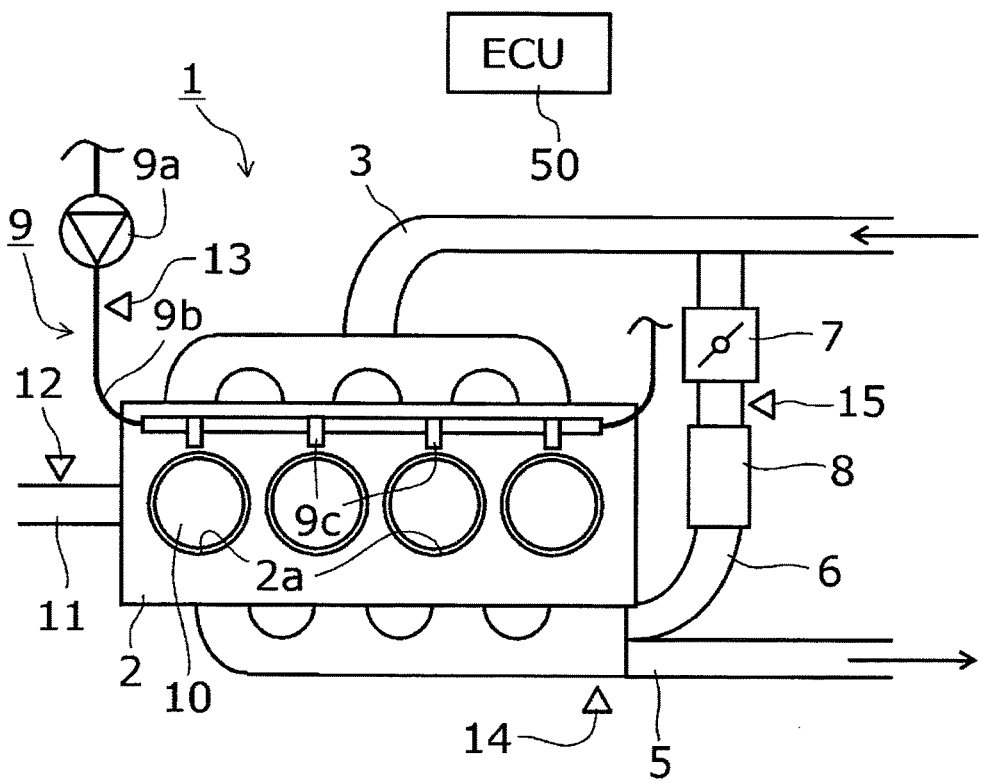
FIG. 2 is a configuration diagram of an engine according to the first embodiment.
Figure 3:
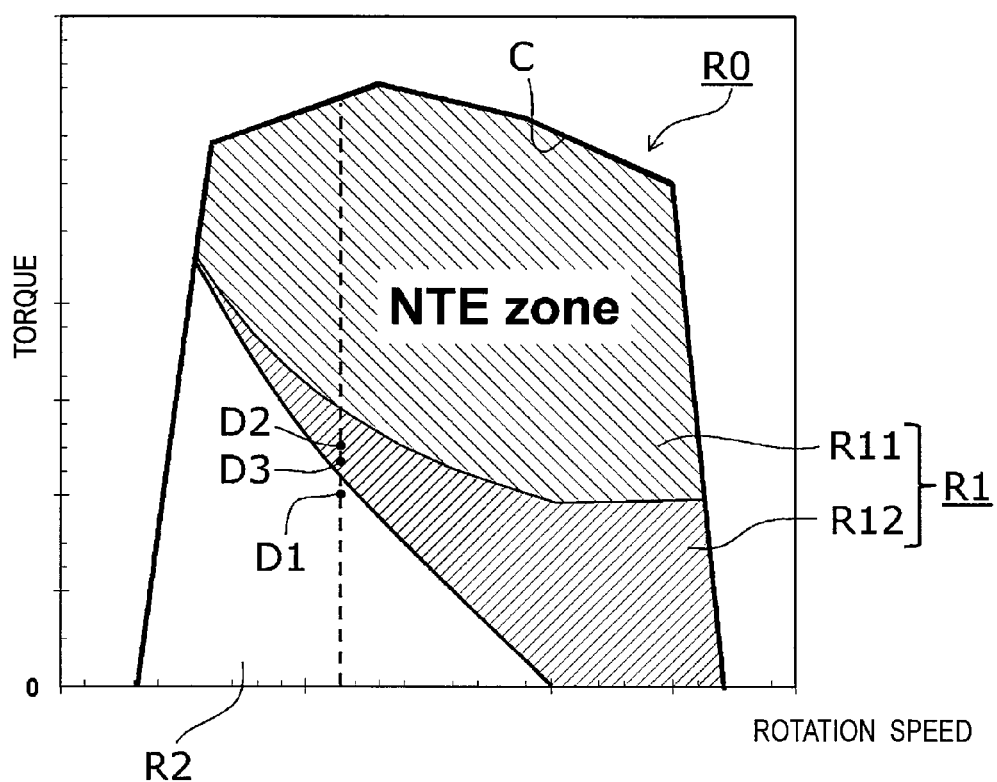
FIG. 3 is a diagram showing a high operating zone and a low operating zone according to the first embodiment.

Referring to FIGS. 1 to 3, a freezing machine 100 according to a first embodiment will be described. FIG. 1 is a block diagram of the freezing machine 100 according to the first embodiment. In FIG. 1, the freezing machine 100 is provided with an engine 1, a refrigerant circuit 20, and a freezer 30. The refrigerant circuit 20 is provided with a compressor 21, a condenser 22, an expansion valve 23, and an evaporator 24. The engine 1 is connected to the compressor 21 to act as a drive source for the compressor 21. The evaporator 24 is disposed inside the freezer 30 to lower the temperature within the freezer 30.

FIG. 2 is a configuration diagram of the engine according to the first embodiment. In FIG. 2, the engine 1 is provided with a casing 2, an intake path 3, an exhaust path 5, an EGR path 6, an EGR valve 7, an EGR cooler 8, a fuel injector 9, four pistons 10, and a crankshaft 11. Four cylinders 2a are formed in the casing 2. The intake path 3 introduces external air into the cylinders 2a. The exhaust path 5 discharges exhaust gas from the cylinders 2a to the exterior. The EGR path 6 connects the exhaust path 5 to the intake path 3 to introduce part of exhaust gas into the intake path 3. The EGR valve 7 alters the opening of the EGR path 6. The EGR cooler 8 is disposed on the EGR path 6 to cool exhaust gas passing through the EGR path 6. The fuel injector 9 employs a common rail system and is provided with a pump 9a, a rail 9b, and four injection nozzles 9c. The pump 9a feeds fuel to the rail 9b to control fuel pressure (rail pressure) within the rail 9b. The injection nozzles 9c inject fuel into the cylinders 2a. The pistons 10 are arranged in the cylinders 2a, respectively. The crankshaft 11 is connected to the four pistons 10 to be driven by reciprocating motions of the pistons 10.

The engine 1 is provided with an ECU (controller) 50, a rotation speed sensor 12, and a rail pressure sensor 13. The ECU 50 controls the EGR valve 7 and the fuel injector 9. The rotation speed sensor 12 detects a rotation speed of the crankshaft 11. The rail pressure sensor 13 detects a rail pressure of the rail 90. The ECU 50 creates a target value of the injection amount in accordance with operating conditions of the engine 1 and controls the injection nozzles 9c in accordance with the target value. For this reason, the ECU 50 can grasp the injection amount. The load factor is specified based on the ratio between the current injection amount and the maximum injection amount achievable by the engine. Hence, the ECU 50 can detect a load factor.

The engine 1 is provided with an upstream temperature sensor 14 and a downstream temperature sensor 15. The upstream temperature sensor 14 detects a temperature (an upstream temperature) of exhaust gas in the exhaust path 5 at the upstream side with respect to the EGR cooler 8. The downstream temperature sensor 15 detects a temperature (a downstream temperature) of exhaust gas in the EGR path 6 at the downstream side of the EGR cooler 8.

Control of the EGR valve 7 will then be described. When operation is performed at a low speed and at a low load, the temperature of the exhaust gas is kept at a relatively low temperature. Exhaust gas flowing through the EGR path 6 is cooled by the EGR cooler 8. Exhaust gas is cooled by the EGR cooler 8 when the temperature of exhaust gas is kept at a relatively low temperature, thereby liquefying unburned components contained in exhaust gas and cohering with carbon. In the case where the temperature of exhaust gas is relatively low in this manner, the ECU 50 fully closes the opening of the EGR valve, to thereby prevent carbon and unburned components from cohering. In the following, low-speed and low-load operation will first be described and then conditions to switch control of the EGR valve 7 will be described.

FIG. 3 is a diagram showing a high operating zone and a low operating zone according to the first embodiment. In FIG. 3, the horizontal axis represents a rotation speed and the vertical axis represents a torque. A characteristic curve shows a relationship between the rotation speed and the torque. An operating zone R0 of the engine 1 is defined as a zone surrounded by the characteristic curve C. The operating zone R0 consists of a high operating zone R1 containing an NTE zone R11 and a low operating zone R2 that is set at a lower torque side and at a lower rotation speed side with respect to the high operating zone R1. The NTE zone is a zone satisfying NTE (Not to Exceed) conditions introduced in the fourth exhaust gas regulation (Tier4 regulation) of the US Environmental Protection Agency. A boundary zone R12 is a zone of the high operating zone R1 outside the NTE zone R11.

The operating conditions of the engine 1 are specified by the rotation speed and the torque. When the operating conditions lie within the low operating zone R2, the low-speed and low-load operation is performed. On the other hand, when the operating conditions lie within the high operating zone R1, the low-speed and low-load operation is not performed.

To control the EGR valve 7, a cut condition and a cut release condition are set. The ECU 50 is configured to fully close the opening of the EGR valve 7 when the cut condition is satisfied. The ECU 50 is configured to variably control the opening of the EGR valve 7 when the cut release condition is satisfied. The cut condition is that the operating conditions stay within the low operating zone R2 during a predetermined time or more. The cut release condition is that the operating conditions enter the high operating zone R1. For the cut condition and the cut release condition, once one condition is satisfied, control of the EGR valve 7 remains unaltered until other condition is satisfied. For example, immediately the operating conditions enter the high operating zone R1 from the low operating zone R2, the cut release condition is satisfied, with the result that the opening of the EGR valve 7 is variably controlled. On the other hand, even if the operating conditions enter the low operating zone R2 from the high operating zone R1, the cut condition remains unsatisfied until the predetermined time elapses. For this reason, the opening of the EGR valve 7 is variably controlled until the predetermined time elapses. When the predetermined time has elapsed, the cut condition is satisfied so that the opening of the EGR valve 7 is fully closed.

To determine whether the conditions are satisfied on the cut condition and the cut release condition, the rotation speed and the torque need to be specified. The rotation speed is detected by the rotation speed sensor 12 as described above. There is a certain corresponding relationship between the torque and each of the load factor, the injection amount, and the rail pressure. For this reason, the torque is specified based on each of the load factor, the injection amount, and the rail pressure. As described above, the ECU 50 can specify the load factor, the injection amount, and the rail pressure. In this case, the ECU 50 is configured to specify three estimated torques, based on the load factor, the injection amount, and the rail pressure, utilizing the fact that each of the load factor, the injection amount, and the rail pressure corresponds to the torque. The three estimated torques include an estimated torque based on the load factor (load factor torque), an estimated torque based on the injection amount (injection amount torque), and an estimated torque based on the rail pressure (rail pressure torque).

The cut condition and the cut release condition utilize the maximum estimated torque among the three estimated torques as a torque for specifying the operating conditions. In FIG. 3, an operating condition D1 is specified by the rotation speed and the load factor torque; an operating condition D2 is specified by the rotation speed and the injection amount torque; and an operating condition D3 is specified by the rotation speed and the rail pressure torque. The operating condition D1 lies within the low operating zone R2, but the operating conditions D2 and D3 lie within the high operating zone R1. In this case, the maximum estimated torque is the injection amount torque contained in the operating condition D2. For this reason, the injection amount torque is utilized as a torque for specifying the operating condition in the cut condition and the cut release condition. Since in FIG. 3 the operating condition D2 lies within the high operating zone R1, the cut release condition is satisfied.

The cut release condition includes two other conditions, in addition to that the operating condition falls within the high operating zone. That is, the cut release condition includes: that the operating condition falls within the high operating zone; that the upstream temperature exceeds a predetermined upstream temperature; or that the downstream temperature exceeds a predetermined downstream temperature. When any one condition of these three conditions is satisfied, the cut release condition is regarded as being satisfied. As described above, the upstream temperature and the downstream temperature are temperatures of the exhaust gas at the upstream side and at the downstream side with respect to the EGR cooler 8. The predetermined upstream temperature and the predetermined downstream temperature are set to temperatures where the temperatures of the exhaust gas are kept at relatively high temperatures at the upstream side and at the downstream side with respect to the EGR cooler 8, which are regarded as not causing cohesion of carbon and unburned components.

Figure 4:
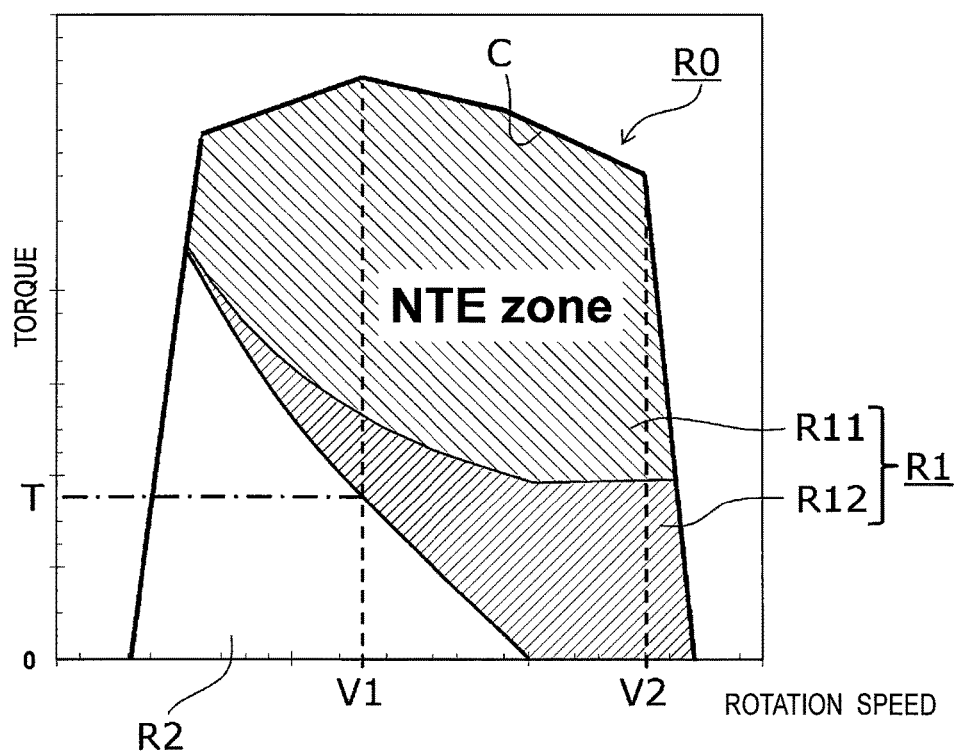
FIG. 4 is a diagram showing the high operating zone and the low operating zone according to a second embodiment.

Referring next to FIG. 4, the freezing machine 100 according to a second embodiment will be described. The freezing machine 100 according to the second embodiment has the same configuration as that of the freezing machine 100 according to the first embodiment. Control of the EGR valve 7 according to the second embodiment is a partial modification of control of the EGR valve 7 according to the first embodiment. In the following, only a difference between the first embodiment and the second embodiment will be described.

FIG. 4 is a diagram showing the high operating zone and the low operating zone according to the embodiment. FIG. 4 is basically the same diagram as FIG. 3. In the second embodiment, the ECU 50 is configured to set a target value of the rotation speed to a low speed V1 or a high speed V2. In the first embodiment, on the other hand, the target value of the rotation speed is not limited to the two speeds (the low speed V1 and the high speed V2). This is the difference between the first embodiment and the second embodiment. The low speed V1 is a rotation speed at which the torque takes a peak value in the characteristic curve C. The high speed V2 is a rotation speed higher than the low speed V1 and the entire torque at the high speed V2 is contained within the high operating zone R1.

When the rotation speed is the high speed V2, the operating condition falls within the high operating zone R1 irrespective of the magnitude of torque. For this reason, when the rotation speed is the high speed V2, the cut release condition is satisfied irrespective of the magnitude of torque. On the other hand, when the rotation speed is the low speed V1, the operating condition lies within the low operating zone R2 if the torque is smaller than a predetermined torque T, whereas the operating condition lies within the high operating zone R1 if the torque is larger than the predetermined torque T. The cut condition is satisfied when the predetermined time has elapsed while the torque is kept smaller than the predetermined torque T.

As described above, there is a certain corresponding relationship between the torque and each of the load factor, the injection amount, and the rail pressure. When the torque arrives at the predetermined torque T, basically the load factor reaches a predetermined load factor, the injection amount reaches a predetermined injection amount, and the rail pressure reaches a predetermined rail pressure. By utilizing this, in the second embodiment, the cut condition and the cut release condition are set as follows.

The cut condition is satisfied if following conditions (A1), (A2), (A3), and (A4) are all met. All of the conditions (A2), (A3), and (A4) being met corresponds to utilizing the maximum estimated torque among the three estimated torques as a torque for specifying the operating condition in the cut condition according to the first embodiment.

(A1) The rotation speed is the low speed V1.
(A2) The load factor is lower than the predetermined load factor.
(A3) The injection amount is smaller than the predetermined injection amount.
(A4) The rail pressure is lower than the predetermined rail pressure.

The cut release condition is satisfied if any one of following conditions (B1), (B2), (B3), (B4), (B5), and (B6) is met. Any one of the conditions (B2), (B3), and (B4) being met corresponds to utilizing the maximum estimated torque among the three estimated torques as a torque for specifying the operating condition in the cut release condition according to the first embodiment.

(B1) The rotation speed is the high speed V2.
(B2) The load factor is higher than the predetermined load factor.
(B3) The injection amount is larger than the predetermined injection amount.
(B4) The rail pressure is higher than the predetermined rail pressure.
(B5) The upstream temperature is higher than the determined upstream temperature.
(B6) The downstream temperature is higher than the determined downstream temperature.

The engine 1 according to this embodiment has the following effects by virtue of the configurations which follow.

(1) The engine 1 according to the first and the second embodiments is the engine 1 that is provided with the EGR cooler 8, the EGR valve 7, and the controller (ECU 50) controlling the opening of the EGR valve 7. The controller (ECU 50) is configured to fully close the opening when the cut condition is satisfied and variably control the opening when the cut release condition is satisfied. The operating zone R0 is defined as a zone surrounded by the characteristic curve indicating a relationship between the rotation speed and the torque. The operating zone R0 includes the high operating zone R1 containing the NTE zone R11 and the low operating zone R2 that is set at lower torque side and at lower rotation speed with respect to the high operating zone. The cut condition is that the operating condition specified by the rotation speed and the torque stays within the low operating zone R2 during the predetermined time or more. The cut release condition is that the operating condition falls within the high operating zone R1.

According to the engine 1 of the first and the second embodiments, the opening of the EGR valve 7 is fully closed if the operating condition remains within the low operating zone R2 during the predetermined time or more. If the operating condition remains within the low operating zone R2, operation is performed at a low speed and at a low load, and the temperature of exhaust gas is kept at a relatively low temperature. Since the opening of the EGR valve 7 is fully closed when the low-speed and low-load operation is performed, exhaust gas does not flow through the EGR cooler 8. As a result, there occurs no cohesion of carbon and unburned components in exhaust gas.

Thus, the engine 1 according to the first and the second embodiments can prevent carbon from depositing on the EGR cooler even if operation continues at a low speed and at a low load.

(2) The engine 1 according to the first and the second embodiments is provided with the common rail type fuel injector 9. The controller (ECU 50) is configured to specify three estimated torques, based on the load factor, the injection amount, and the rail pressure. The cut condition and the cut release condition employ the maximum estimated torque among the three estimated torques as the torque for specifying the operating condition.

Three estimated torques corresponding to the torque are obtained based on the load factor, the injection amount, and the rail pressure. Therefore, the engine 1 according to the first and the second embodiments can recognize occurrence of the low-speed and low-load operation, using the estimated torque as an estimated value of the torque, instead of directly detecting the torque.

(3) In the engine 1 according to the first and the second embodiments, the cut release condition includes: that the operating condition falls within the high operating zone R1; that the upstream temperature exceeds the predetermined upstream temperature; or that the downstream temperature exceeds the predetermined downstream temperature. The upstream temperature and the downstream temperature are temperatures of exhaust gas at the upstream side and at the downstream side, respectively, with respect to the EGR cooler 8.

Thus, the engine 1 according to the first and the second embodiments can prevent the EGR valve 7 from being fully closed in the case where there is no fear of occurrence of cohesion of carbon and unburned components in exhaust gas.

(4) In the engine 1 according to the second embodiment, the controller (ECU 50) is configured to set a target value of the rotation speed to a low speed V1 or a high speed V2. The low speed V1 is the rotation speed at which the torque takes its peak value in the characteristic curve C. The high speed V2 is the rotation speed higher than low speed V1, and the entirety of the torque at the high speed V2 is contained in the high operating zone R1.

Only when the rotation speed is at the low speed V1, it is determined whether the operating conditions lie within the low operating zone R2. Hence, the engine 1 according to the second embodiment can relieve loads required in control.

(5) The freezing machine 100 according to the first and the second embodiments has the engine 1 and the compressor 21 driven by the engine 1.

For this reason, the freezing machine 100 according to the first and the second embodiments can prevent carbon from depositing on the EGR cooler 8 even if operation continues at a low speed and at a low load.

EXPLANATION OF REFERENCE NUMERALS

1 engine
7 EGR valve
8 EGR cooler
12 rotation speed sensor
13 rail pressure sensor
14 upstream temperature sensor[
15 downstream temperature sensor
50 ECU (controller)
C characteristic curve
R0 operating zone
R1 high operating zone
R2 low operating zone
R11 NTE zone
V1 low speed
V2 high speed

The invention claimed is:

1. An engine comprising an EGR cooler without a bypass, an EGR valve, a common rail type fuel injector, an upstream exhaust gas temperature sensor upstream of the EGR cooler, a downstream exhaust gas temperature sensor downstream of the EGR cooler and upstream of the EGR valve, and a controller controlling an opening of the EGR valve,
   the controller being configured to fully close the opening when a cut condition is satisfied and variably control the opening when a cut release condition is satisfied,
   wherein
      an operating zone is defined as a zone surrounded by a characteristic curve indicating a relationship between rotation speed and torque,
      the operating zone comprises a high operating zone containing an NTE zone, and a low operating zone that is set at a lower torque side and at a lower rotation speed side with respect to the high operating zone,
      the cut condition is that an operating condition specified by the rotation speed and the torque is kept within the low operating zone for a predetermined time period or more,
      the cut release condition is that the operating condition falls within the high operating zone, and
      the controller is configured to:
         specify a first estimated torque based on a load factor, a second estimated torque based on an injection amount, and a third estimated torque based on a rail pressure,
         determine which of the first, second and third estimated torques is a maximum estimated torque,
         determine whether an upstream temperature sensed by the upstream temperature sensor exceeds a predetermined upstream temperature,
         determine whether a downstream temperature sensed by the downstream temperature sensor exceeds a predetermined downstream temperature,
         determine whether the cut condition exists and control the EGR valve to a closed position if the predetermined time period has been exceeded in which the maximum estimated torque is below a predetermined torque, and
         determine the cut release condition exists and control the EGR valve to an at least partially open position if the maximum estimated torque exceeds the predetermined torque, or the upstream temperature exceeds the predetermined upstream temperature, or the downstream temperature exceeds the predetermined downstream temperature.

2. The engine according to claim 1, wherein
   the controller is configured to set a target value of the rotation speed to a low speed or a high speed,
   the low speed is the rotation speed at which the torque takes its peak value in the characteristic curve, and
   the high speed is the rotation speed higher than the low speed, the entirety of the torque at the high speed being contained in the high operating zone.

3. A freezing machine comprising:
   an engine; and
   a compressor driven by the engine,
   the engine comprising an EGR cooler without a bypass, an EGR valve, a common rail type fuel injector, an upstream exhaust gas temperature sensor upstream of the EGR cooler, a downstream exhaust gas temperature sensor downstream of the EGR cooler and upstream of the EGR valve, and a controller controlling an opening of the EGR valve, wherein the controller is configured to fully close the opening when a cut condition is satisfied and variably control the opening when a cut release condition is satisfied, wherein an operating zone is defined as a zone surrounded by a characteristic curve indicating a relationship between rotation speed and torque, the operating zone comprises a high operating zone containing an NTE zone, and a low operating zone that is set at a lower torque side and at a lower rotation speed side with respect to the high operating zone, the cut condition is that an operating condition specified by the rotation speed and the torque is kept within the low operating zone for a predetermined time period or more, the cut release condition is that the operating condition falls within the high operating zone, and the controller is configured to:
  specify a first estimated torque based on a load factor, a second estimated torque based on an injection amount, and a third estimated torque based on a rail pressure,
  determine which of the first, second and third estimated torques is a maximum estimated torque,
  determine whether an upstream temperature sensed by the upstream temperature sensor exceeds a predetermined upstream temperature,
  determine whether a downstream temperature sensed by the downstream temperature sensor exceeds a predetermined downstream temperature,
  determine whether the cut condition exists and control the EGR valve to a closed position if the predetermined time period has been exceeded in which the maximum estimated torque is below a predetermined torque, and
  determine the cut release condition exists and control the EGR valve to an at least partially open position if the maximum estimated torque exceeds the predetermined torque, or the upstream temperature exceeds the predetermined upstream temperature, or the downstream temperature exceeds the predetermined downstream temperature.

4. The freezing machine according to claim 3, wherein
the controller is configured to set a target value of the rotation speed to a low speed or a high speed,
the low speed is the rotation speed at which the torque takes its peak value in the characteristic curve, and
the high speed is the rotation speed higher than the low speed, the entirety of the torque at the high speed being contained in the high operating zone.

* * * * *